Dec. 3, 1968    A. H. HOFFMANN ET AL    3,414,788
EXCITATION CONTROL SYSTEM FOR SYNCHRONOUS MOTORS
Filed June 1, 1965    2 Sheets-Sheet 1
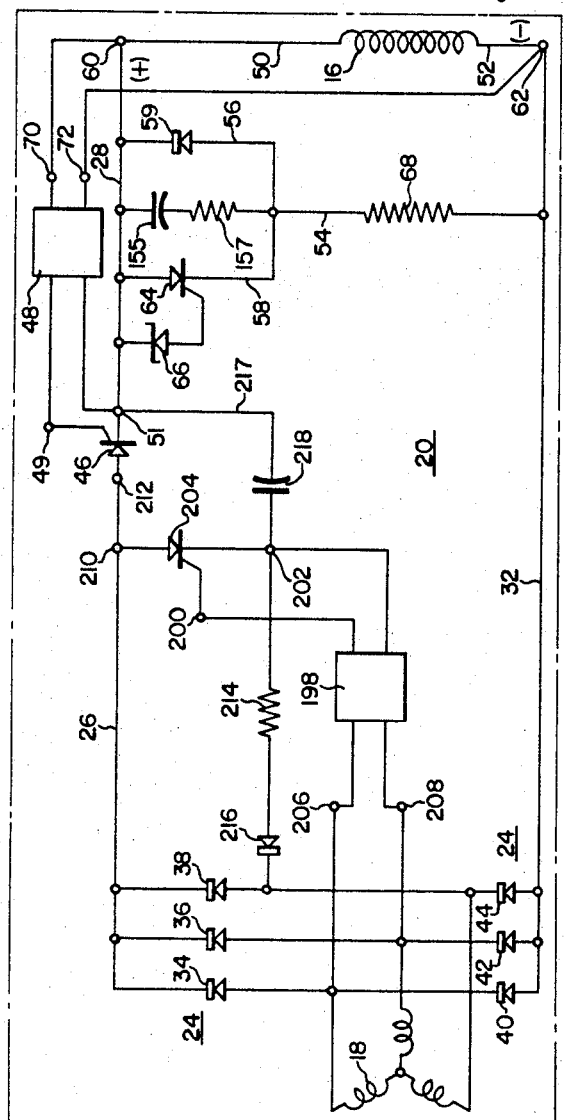
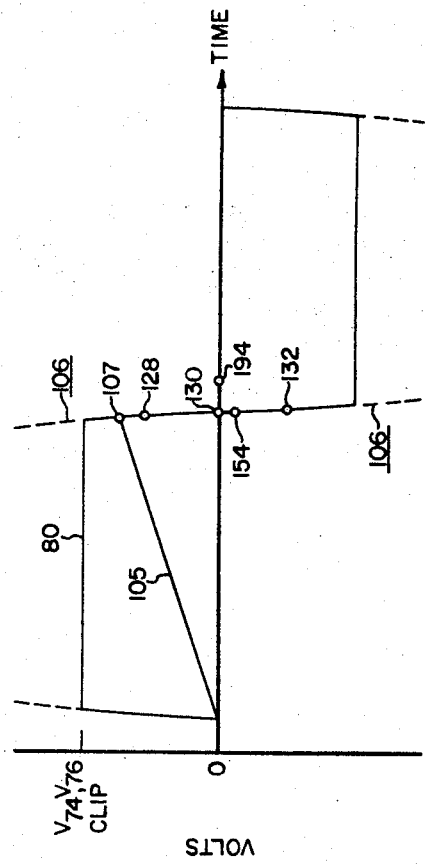
WITNESSES
Theodore F. Wedel
James F. Young
INVENTORS
Arthur H. Hoffmann
& Frank V. Frola
BY E. F. Possessky
ATTORNEY

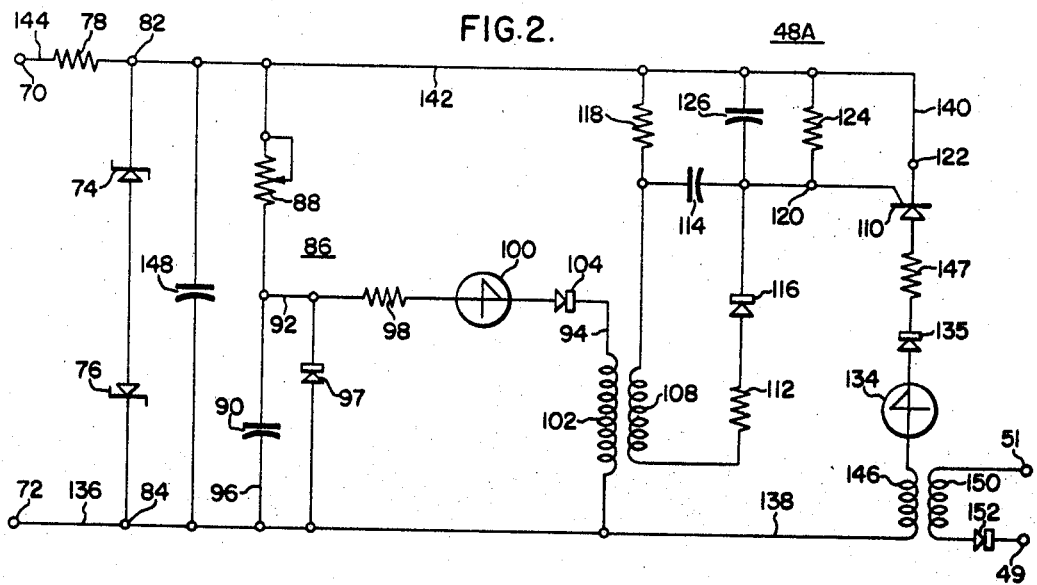
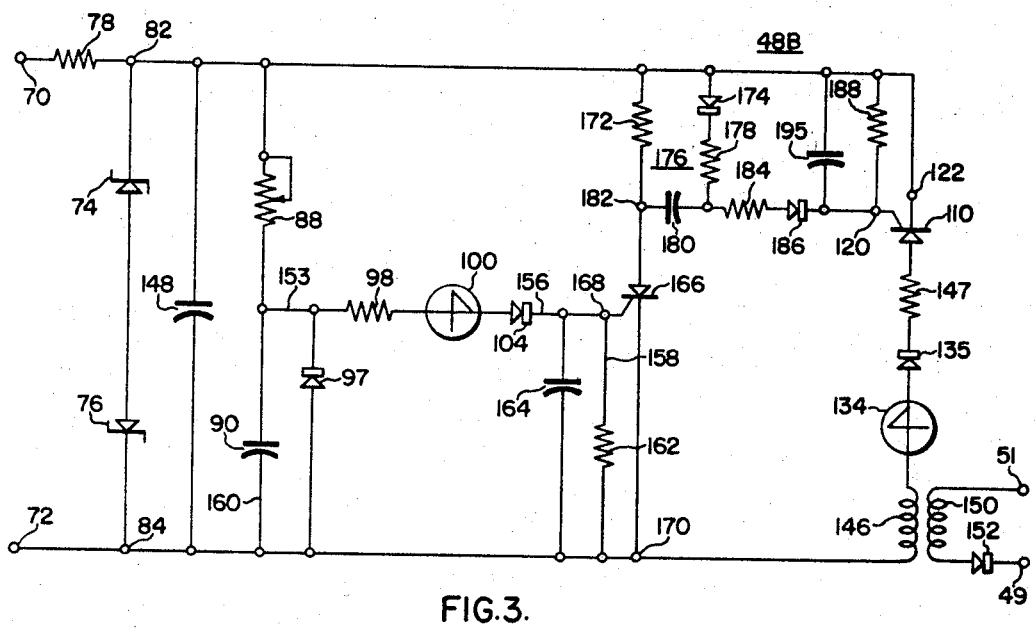

United States Patent Office 3,414,788
Patented Dec. 3, 1968

3,414,788
EXCITATION CONTROL SYSTEM FOR
SYNCHRONOUS MOTORS
Arthur H. Hoffmann and Frank V. Frola, Monroeville,
Pa., assignors to Westinghouse Electric Corporation,
Pittsburgh, Pa., a corporation of Pennsylvania
Filed June 1, 1965, Ser. No. 460,265
8 Claims. (Cl. 318—176)

ABSTRACT OF THE DISCLOSURE

A control system for applying field excitation to a brushless synchronous motor. This system includes a field discharge resistor controlled by a semiconductor discharge switch and has means for insuring that the discharge switch is turned off before the exciter switch is turned on to apply field excitation, thus eliminating the necessity for additional circuitry to turn off the discharge switch.

---

The present invention relates to synchronous motor control systems and more particularly to brushless systems in which DC excitation application and field resistor removal are achieved in an improved manner.

Generally, a control system for a synchronous motor comprises a field discharge circuit for discharging induced field current during the start-up period and a DC excitation circuit for energizing the motor field winding at synchronous speed as well as during a predetermined terminal interval of the start-up period. The presynchronization application of DC excitation to the field winding is ordinarily necessary to develop the torque required to synchronize the motor. Just before or after synchronization, a field discharge circuit must be opened or removed from operation so as to avoid current drain from the DC excitation circuit. For greater detail on the theory of synchronization, reference is made to the copending application entitled, "Brushless Synchronous Motor Control System and Circuitry Therefor," Ser. No. 368,484, filed by F. V. Frola on May 19, 1964, and assigned to the present assignee. As indicated in that application, switching devices and other components in the control circuitry of a brushless synchronous motor preferably are solid state or static devices since they are shaft mounted and therefore subjected to forces of rotation.

It is desirable that the DC excitation be applied at a predetermined point in time or in the slip voltage waveform, or at least at a predetermined slip voltage frequency and within a certain phase range of the slip voltage cycle at that frequency. In some applications where the motor is accelerated with zero or light load, the motor can be synchronized without the application of DC excitation during the slip period and circuitry then can be employed for applying the DC excitation after synchronization is achieved. Circuitry for this purpose is disclosed in a copending application entitled "Synchronous Motor Control System with Post Synchronization Control of D.C. Excitation," Ser. No. 493,783, filed by A. Hoffmann on Oct. 7, 1965 and assigned to the present assignee. Normally, however, DC excitation must be applied in the slip period for synchronism to be achieved.

In the above-mentioned Frola copending application, circuitry is employed for sharply firing a semiconductor exciter switch in the excitation circuit at a predetermined slip voltage frequency and just as the slip voltage is reversing from a positive to a negative polarity. Inherent characteristics of the firing circuit produce the accurately timed firing of the exciter switch. Since the exciter switch is fired just as the slip voltage passes through zero to a negative value, there is some degree of probability that the semiconductor field discharge switch in the field discharge circuit may continue to conduct after the exciter switch is turned on. Some of the current in the excitation circuit is then drained through the field discharge switch and shunted from the motor field winding. Since the magnitude of the drainage current from the excitation circuit can be substantial, it is normally necessary that separate "field resistor removal" circuitry be employed to open the field discharge switch within a short interval of time.

By the terms of the present invention, the need for special field resistor removal circuitry is eliminated through the employment of circuitry which fires the exciter switch after the field discharge switch is open. In accordance with the broad principles of the invention, a synchronous motor control ssytem comprises a semiconductor exciter switch which transmits DC excitation energy through an excitation circuit to the motor field winding means, and further comprises a semiconductor discharge switch which controls the continuity of an induced current discharge path through the field winding means and a field discharge resistor. To achieve synchronism, firing or gating circuit means provide a sharp signal or pulse in response to the frequency of induced or slip voltage across the field winding means, and the exciter switch is closed at substantially predetermined slip voltage frequency and within the best phase range of the slip voltage cycle at that frequency. The particular phase point at which the exciter switch is fired assures prior reversal of polarity across the field discharge switch so that the discharge switch is open when DC exciting current starts to flow through the exciter switch to energize the field winding means. Any need for special field resistor removal circuitry is thus eliminated.

It is therefore an object of the invention is to provide a novel control system for efficiently effecting synchronism in a synchronous motor.

Another object of the invention is to provide a novel control system for a brushless synchronous motor in which DC excitation and field resistor removal are achieved with improved efficiency and fewer components.

A further object of the invention is to provide a novel control system for efficiently effecting timely application of DC excitation to the field winding means of a brushless synchronous motor.

An additional object of the invention is to provide a novel control system for a brushless synchronous motor wherein a sharp signal or pulse is employed to achieve timely application of DC field energization so as efficiently to achieve synchronism.

It is another object of the invention to provide a novel control system for a brushless synchronous motor wherein DC excitation is applied at a substantially predetermined time in the slip voltage waveform so as to assure field resistor removal prior to application of the DC excitation.

It is a further object of the invention to provide a novel control system for a brushless synchronous motor wherein DC excitation is applied substantially within the best phase range in the slip voltage waveform and wherein field resistor removal is achieved prior to application of the DC excitation.

Another object of the invention is to provide novel firing circuitry which operates in an efficient and timely manner.

These and other objects of the invention will become more apparent upon consideration of the following detailed description along with the attached drawings, in which:

FIGURE 1 is a schematic view of a brushless synchronous motor and its control system arranged in accordance with the principles of the invention;

FIG. 2 is a schematic view of one embodiment of a firing circuit employed in the system of FIG. 1;

FIG. 3 is a schematic view of the preferred embodiment of a firing circuit employed in the system of FIG. 1; and FIG. 4 graphically shows the voltage conditions for field resistance removal and for application of DC excitation to the motor field winding.

More specifically, there is shown schematically in FIG. 1 a synchronous motor 10 having any suitable power rating. Although the invention can be embodied to control synchronous motors having brushes and collector rings, it is especially useful in connection with brushless motor systems and the motor 10 is therefore illustrated as a brushless motor.

The motor 10 has a three-phase stator winding 12, and an exciter is provided with a field winding 14 which is also carried on a stator. The stator winding 12 is suitably energized, for example by a three phase AC source (not shown) and the exciter field winding 14 is suitably energized by a DC source (not shown). If desired, a rectifier (not shown) can provide excitation power for the exciter field 14 from the AC source.

The stator winding 12 produces a rotating magnetic flux wave in the air gap of the motor and thereby interacts with motor field winding means 16 and amortisseur windings (not shown) to produce start-up and synchronous operating torques for the motor 10. The field winding means 16 and the amortisseur windings are suitably disposed on a predetermined number of salient rotor poles in accordance with well established synchronous motor design principles.

The exciter field 14 interacts with a rotating exciter armature winding 18 which generates the necessary energy for exciting the motor field winding means 16 and thereby eliminates the need for brushes otherwise used in transmitting excitation energy to the rotating field winding means 16 from a stationary power source through collector rings. A common shaft (not shown) is preferably employed for the field winding means 16 and the exciter armature 18 as well as control system 20 which is connected between the exciter armature 18 and the field winding means 16. Those components which are within dotted box 22 in FIG. 1 are thus all subject to rotation.

The control system 20 provides control action which normally assures development of start-up torque through induction motor action as well as the final synchronous pull-up torque through timely application of DC excitation across the field winding means 16. Thereafter, DC excitation is continuously applied to the field winding means 16 so as to provide the operating torque necessary to drive the motor load at synchronous speed. During the start-up period, the field winding 16 discharges current through a field discharge resistance so as to prevent winding insulation damage from open circuit induced voltages and so as to increase the torque developed by the motor 10 during the start-up period. The field discharge resistance is removed before application of the DC excitation by opening the field discharge circuit path.

The control system 20 provides this performance by means of circuitry having solid state or other static components which can reliably function while undergoing the severe forces developed during rotation. The description of circuit operation which follows is set forth as it is presently understood in terms of established circuit theory in order to clarify and not to limit the invention.

More specifically, a rectifier means 24 is connected to the exciter armature 18 for the purpose of providing DC excitation for the field winding means 16 through DC excitation circuit path 26, 28, 50, 52 and 32. The rectifier 24 can be a three phase full wave rectifier, and it thus includes feeder diodes 34, 36 and 38 and return diodes 40, 42 and 44. Direct excitation current is blocked from flowing by semiconductor switching means or a silicon controlled rectifier switch 46 unless a firing or gating circuit 48 is operated to apply a gating pulse to gate and cathode terminals 49 and 51 and thereby fire the exciter switch 46. Gated excitation current through the exciter switch 46 can have substantial amplitude, and the switch 46 is provided with a current rating suitable for the particular synchronous motor in which it is used.

A field discharge circuit path 50, 52, 54 and 56 or 58 provides for the discharge of induced field current through a field discharge resistor 68 from the field winding means 16. Induced field current components of one polarity are carried through the branch 56 and diode 59 when field winding terminal 60 is negative relative to field winding terminal 62, and when the polarity is reversed semiconductor switching means or silicon controlled rectifier switch 64 carries the induced field current components of the opposite polarity through the circuit branch 58 once the avalanche or breakdown voltage of a Zener gate diode 66 is surpassed. Hereinafter, whenever the term positive field voltage is used, it is meant that the polarity of the induced field voltage is such that the field terminal 60 is positive relative to the field terminal 62.

When the motor reaches synchronous speed, there is substantially no induced field current in the discharge path 50, 52, 54 and 56 or 58 because the field winding means 16 are then rotating in synchronism with the rotating flux wave produced by the stator winding 12. Further, at synchronism, there is substantially no current in the field discharge resistor 68 since the diode 59 and the field discharge switch 64 normally block DC excitation current from the DC excitation path branch 28 as will subsequently be discussed more fully.

The gating circuit 48 can be provided in various forms, and one embodiment is shown in FIG. 2 in the form of a firing circuit 48A while a preferred embodiment is shown in FIG. 3 in the form of a firing circuit 48B. Generally, the gating circuit 48 fires the exciter switch 46 substantially at a predetermined time in the slip voltage waveform and to achieve this performance it is connected to respond directly to the frequency of the slip voltage waveform. By "respond directly" it is meant to refer to a relationship by which the exciter switch 46 is fired in direct dependency on the slip or induced field voltage frequency without any material dependence on any intermediate operating circuit parameters. Within this meaning, it is thus appropriate to connect the gating circuit 48 across the field resistor 68 or across the field winding terminals 60 and 62. The fact that the field discharge switch 64 does not conduct until shortly after the beginning of each positive half-cycle of slip voltage does not materially affect the operation of the gating circuit 48 if it is connected across the field resistor.

The predetermined point in time in the slip voltage waveform corresponds to a predetermined best slip voltage frequency (say at 95% of synchronous speed) and within the best phase range of the slip voltage cycle at the predetermined slip frequency. The particular phase in the slip voltage cycle at which the exciter switch 46 is fired corresponds to a point in the negative half cycle of the slip voltage which is sufficiently negative to assure reversal of polarity across the discharge switch 64. Accordingly, once the slip frequency has decreased to the predetermined value (say three or four cycles per second) and the slip voltage cycle reaches the preselected phase point, the exciter switch 46 is sharply fired without need for special circuitry to open the field discharge switch 64. Firing of the exciter switch 46 is dependent primarily upon slip voltage frequency and not to any material extent on other system factors such as age and temperature varying switch gating or other similar component characteristics which only produce error influence on circuit timing operation.

The firing circuit 48A includes input terminals 70 and 72 preferably respectively connected to the field terminals 60 and 62 to obtain direct response to the slip voltage frequency, and further includes output terminals connected to the gate and cathode terminals 49 and 51 of the exciter switch 46 as indicated in FIGS. 1 and 2.

The field voltage is applied to Zener diodes 74 and 76 through a current limiting resistor 78, and a clipped and reduced voltage waveform 80 (FIG. 4) is thus produced at terminals 82 and 84 and applied across an RC energy storage timing circuit 86 including a variable resistor (or potentiometer) 88 and a timing capacitor 90. One advantage gained by clipping the field voltage in this manner is that the control system 20 can be standardized for employment in motors of various ratings. Another is that lower rated control components can be used.

A discharge path 92, 94 and 96 is provided for the timing capacitor 90. In the discharge path, there is included a current limiting resistor 98, a breakdown diode 100 which has switching or breakdown characteristics similar to those of a Zener diode (except that on breakdown substantially zero impedance is presented by the breakdown diode 100), a primary winding 102 of a transformer, and a rectifier 104 which prevents reverse current flow through the breakdown diode 100.

The time constant of the timing circuit 86 is set such that the rate at which voltage builds up on the timing capacitor 90 is insufficient to fire the breakdown diode 100 until the slip voltage waveform reaches a cycle 106 (FIG. 4) having the predetermined frequency at which it is desired to apply the DC excitation to the field winding means 16. When the motor 10 reaches the critical speed at which the critical slip frequency cycle 106 is generated, the voltage (as indicated by the reference character 105) across the timing capacitor 90 causes the breakdown diode 100 to fire (as indicated by the reference character 107) in the positive half of the slip voltage cycle 106, and a discharge pulse flows through the breakdown diode 100 and the transformer primary 102 so as to induce a current pulse in transformer secondary 108. A diode 97 assures a zero charge condition on the timing capacitor 90 at the beginning of each positive half cycle of the slip voltage waveform. It is noted that the firing point 107 can occur at an intermediate time point in the slip voltage positive half cycle if the first positive slip voltage half cycle having sufficient duration to fire the diode 100 is characterized with a lower frequency (say two cycles per second) than the critical frequency (say four cycles per second).

The current pulse in the transformer secondary 108 is employed to gate a frequency switch 110 in the form of semiconductor switching means or a silicon controlled rectifier. The switch 110 is characterized as a frequency switch in the sense that it becomes gated at the critical slip frequency at which it is desired to fire the exciter switch 46.

For the gating purpose, the transformer secondary 108 is connected in a circuit loop including a charging combination of a resistor 112 and a capacitor 114 as well as a diode 116 which prevents reverse current flow. The charging capacitor 114 in turn is connetced with a gate resistor 118 between gate and cathode terminals 120 and 122 of the frequency switch 110. A resistor 124 and a capacitor 126 are also connected between the gate and cathode terminals 120 and 122 to suppress high frequency voltage spikes. Almost instantly after the production of a current pulse in the transformer secondary 108, the frequency switch 110 is gated by the rising voltage on the capacitor 114 as indicated for example by the time point 128 shown in FIG. 4. The charge on the capacitor 114 is adequate to maintain the frequency switch 110 in a gated condition for a limited interval of time.

As the slip voltage cycle 106 crosses the zero voltage value as indicated by the reference character 130 in FIG. 4, and proceeds into the negative half cycle (that is when the terminals 62 and 72 go positive in relation to the terminals 60 and 70), the frequency switch 110 remains in gated but unfired condition. However, the slip voltage reaches sufficient negative voltage magnitude (as indicated by the reference character 132 in FIG. 4) to fire an output phase switch in the form of semiconductor switching means or a breakdown diode 134 which is connected with the frequency switch 110 and the terminals 70 and 72 in a circuit loop 136, 138, 140, 142 and 144. A diode 135 aids in preventing reverse current flow in the loop while a resistor 147 limits forward current flow. When the phase switch 134 is fired, the frequency switch 110 is likewise fired since it is still gated.

A primary winding 146 of an output trasnformer is also connected in the phase and frequency switch circuit loop so as to carry the sharp current pulse which is produced when the frequency and phase switches 110 and 134 are both conductive (as indicated at phase point 132). A secondary winding 150 of the output transformer couples the generated pulse through a directing diode 152 to the exciter switch gate and cathode terminals 49 and 51 to thereby fire the exciter switch 46. A typical slip voltage magnitude corresponding to the firing point 132 would be minus 20 volts corresponding to the voltage breakdown level for a common commercially available breakdown diode.

To increase the magnitude and sharpness of the pulse which flows through the transformer primary 146, it is preferred that a charging capacitor 148 be connected between the Zener diode terminals 82 and 84. The capacitor 148 accordingly accumulates stored energy in the negative half cycle so as to increase the total available energy for generating the current pulse at the slip cycle phase point 132.

The phase point 132 at which the exciter switch 46 is fired is located within the best phase range for firing the exciter switch since it is located in an early interval of the slip voltage negative half cycle (when the salient poles are in aiding relation with the air gap poles). Further, the phase point 132 is sufficiently negative to assure sufficient reversal of polarity across the field discharge switch 64 to turn it off in the time interval between the phase points 128 and 132 (for example at the phase point represented by the reference character 154 in FIG. 4). Thus, at the phase point 154, the field discharge switch 64 is open so as to remove the field resistor 68 from the field discharge circuit, and the exciter switch 46 is subsequently sharply fired at the point 132 to apply DC excitation to the field winding means 16 without any current drainage through the field resistor 68. The application of the DC excitation is achieved at a predetermined point in time in the slip voltage waveform and at the best slip voltage frequency and within the best phase range of the slip voltage cycle at the best frequency. As the exciter switch 46 is fired, induced field current is flowing through the discharge circuit diode 59 and such current is rapidly switched off by diode switching action. Inductance effects in the system circuitry can cause the voltage across the field switch 64 to rise high enough to avalanche the Zener diode 66 and reclose the switch 64. To dampen voltage transients and prevent field switch refiring, a capacitor 155 and a resistor 157 are bridged across the switch 64.

The firing circuit 48B is the preferred embodiment for use in the control system 20 as previously indicated, and a number of its components are similar to those described for the firing circuit 48A. Accordingly, like reference characters are employed for like components in the two circuits.

In the firing circuit 48B, the timing capacitor 90 is connected in a circuit loop 153, 156, 158 and 160 which includes the current limiting resistor 98 and the breakdown diode 100. A gate resistor 162 is also connected in the timing capacitor discharge loop and the diode 104 prevents current reversal through the breakdown diode 100 as in the previous embodiment. A capacitor 164 is connected across the gate resistor 162 to provide a low impedance path for high frequency currents.

A normally blocking switch for controlling the gating of the frequency switch 110 is provided in the form of semiconductor switching means or a silicon controlled rectifier 166 having gate and cathode terminals 168 and 170 respectively connected across the gate resistor 162 in the timing capacitor discharge circuit. When the slip voltage waveform reaches the positive half of the slip voltage cycle 106 and the timing capacitor 90 discharges a pulse of current in the timing capacitor discharge circuit, the gating control switch 166 is gated and fired to conduct current from the input terminal 70 to the input terminal 72 through a current limiting resistor 172 during the balance of the positive half cycle of the slip voltage cycle 106. In addition, part of the current gated through the gating control switch 166 flows from the input terminal 70 through a directing diode 174 and a charging circuit 176 including a resistor 178 and a charging capacitor 180. The charging circuit 176 is thus shunted across the current limiting resistor 172 and connected to an anode terminal 182 of the gating control switch 166. Accordingly, for the balance of the positive half cycle of the slip voltage waveform from the phase point 107 to the phase point 130, the capacitor 180 is charged with a voltage having the polarity indicated in FIG. 3.

When the slip voltage cycle 106 reaches the zero value phase point 130, the polarity of input terminals 70 and 72 begins to reverse and a voltage of reverse polarity is applied across the cathode and anode terminals 170 and 182 of the gating control switch 166 which is then switched to a non-conductive or open state. Since current is blocked from flowing through the charging circuit resistor 178 by the diode 174, the charging capacitor 180 discharges through a resistor 184, a current directing diode 186, the frequency switch gating path and the current limiting resistor 172. Gate and cathode terminals 120 and 122 of the frequency switch 110 are connected across a gate resistor 188 and a capacitor 195 which suppress high frequency voltage spikes.

Since the capacitor 180 is charged during the entire period during which the switch 166 is gated and since it is not discharged until the switch 166 is turned off as the slip voltage goes negative, substantial energy is available on the capacitor 180 to hold the frequency switch 110 gated for an interval of time well in excess of the required minimum time, for example from the point in time indicated by the reference character 130 through the point in time indicated by the reference character 194 on the time axis in FIGURE 4. The required hold on the gating of the frequency switch 110 is thus realized even if the gating switch 166 is fired at an intermediate time point in the positive half cycle under circumstances previously considered. There is thus a comfortable margin of assurance that the frequency switch 110 will be gated when the phase switch 134 becomes conductive to generate an output pulse in the manner described in connection with FIG. 2. The capacitor 148 is also used in the circuit 48B to increase the energy content and the sharpness of the output pulse.

In contrast, the energy for gating the frequency switch 110 in the firing circuit 48A is limited to the energy contained in the pulse produced in the transformer secondary winding 108 and such energy may be inadequate to hold the frequency switch 110 gated for the required time if the breakdown diode 100 produces the transformer pulse too early in the positive half cycle under circumstances previously considered. The firing circuit 48B accordingly provides greater reliability of operation in a wider range of applications and it is preferred for use for this reason. Since the firing circuit 48B employs a gating control switch 166 instead of a transformer to initiate gating of the frequency switch 110, an additional advantage exists in the form of lower power level requirements for proper circuit functioning.

As in the case of the firing circuit 48A, the firing circuit 48B produces a sharp pulse or signal in the output winding 150 to fire the exciter switch 46 after the field discharge switch 64 has been opened between the terminals 60 and 62. With the application of DC excitation to the field winding means 16, the motor 10 then is efficiently synchronized with the field discharge switch 64 opened.

With the exciter switch 46 in a continuing state of conduction, the motor 10 normally maintains its synchronous speed and delivers the required load torque. At various times, however, such as when the required load torque exceeds the available synchronous torque or when a substantial voltage decrease appears across the motor stator 12, the motor 10 can step out of synchronism and it is then necessary that the control circuit 20 operate to produce a resynchronizing torque. In most applications, the negative field voltage which is induced when the motor pulls out of synchronism can be sufficient, say at 90% of synchronous speed, to apply a back voltage across the switch 46 and thus cause it to be reopened. In such case, resynchronizing circuit action is instituted by induction motor action in the manner already described since the field discharge switch 64 is then fired when the Zener diode 66 avalanches in response to the induced positive field voltage.

In some cases, however, it may be desirable to employ a resynchronizing firing circuit 198 (FIG. 1) having output terminals connected to gate and cathode terminals 200 and 202 of a normally open cut-out switch 204. Input terminals of the resynchronizing firing circuit 198 are connected to terminals 206 and 208 of the exciter armature 18 so as to sense a decrease of motor speed to a predetermined level. The cut-out switch 204 has an anode terminal 210 commonly connected to an anode terminal 212 of the exciter switch 46 and the cut-out switch cathode terminal 202 is connected to the negative plate of a charging capacitor 218 and to the exciter armature through a current limiting resistor 214 and a current directing diode 216. The capacitor 218 is charged by the D.C. excitation voltage through a circuit branch 217. When the cut-out switch 204 is fired, the anode terminal 212 of the exciter switch 46 approaches the negative potential of the capacitor 218 and the exciter switch 46 is accordingly rapidly turned off. A fuller description of the resynchronization process resulting in firing the cut-out switch 204 is set forth in the aforementioned Frola copending application. Since the circuit 198 requires the use of a relatively large capacitor unit (usually electrolytic) for the capacitor 218 and therefore creates reliability problems, it is preferred that the circuit 198 normally be omitted from the system 20.

The foregoing description has been presented only to illustrate the principles of the invention. Accordingly, it is desired that the invention be not limited by the embodiments described, but, rather, that it be accorded an interpretation consistent with the scope and spirit of its broad principles.

What is claimed is:

1. In a synchronous machine system having rotating motor field winding means, an alternating current exciter armature rotatable with the field winding means, rectifier means connected to said exciter armature to supply direct current excitation to the field winding means, a control system comprising a discharge circuit connected across the field winding means and including a field resistor and a semiconductor field discharge switch for closing said discharge circuit and discharging current components of one polarity induced in the field winding means at subsynchronous speeds, a semiconductor exciter switch connected in an excitation circuit between said rectifier means and the field winding means to control the direct current excitation, and firing circuit means directly responsive to the slip frequency of voltage induced in the field winding means for transmitting a sharp gating pulse to said exciter switch substantially at a predetermined slip voltage frequency and substantially with a predetermined phase range of a slip voltage half cycle of the other polarity to assure field discharge switch turnoff before the exciter switch is fired, said firing circuit means having input terminals and comprising an energy storage timing circuit and a semiconductor frequency switch, a gating circuit for controlling said frequency switch, a charging capacitor connected in said gating circuit, a gate controlling semiconductor switch, means for coupling said timing circuit to said gate switch so as to fire said gate switch when the slip voltage reaches the predetermined frequency in a half cycle of the one polarity, means for charging said charging capacitor through said gate switch and through said input terminals when said gate switch is fired, means directing discharge current to said gating circuit from said charging capacitor when the slip voltage reverses to the other polarity and opens said gate switch, phase switch means connected in series with said frequency switch, said frequency switch and said phase switch means connected in a circuit loop including said input terminals so that said phase switch means is responsible to slip voltage reversal to the other polarity to become conductive while said frequency switch is gated by said gating circuit and within the predetermined slip voltage phase range, means for coupling to said exciter switch the sharp current pulse generated when said frequency switch and said phase switch means are both conductive, and an energy storage capacitor connected to be charged by voltage across said firing circuit input terminals and to discharge through said frequency switch and said phase switch means and thereby increase the energy level of the sharp current pulse.

2. In a synchronous motor having a rotating field winding, an alternating current exciter having an armature rotatable with the motor field winding, and rectifier means connected to the exciter armature and rotatable therewith for supplying direct current excitation to the motor field winding, a control system for the motor field winding including semiconductor exciter switch means connected between said rectifier means and the motor field winding to control said direct current excitation, a field discharge resistor, semiconductor field discharge switch means for connecting said resistor across the field winding during operation at sub-synchronous speeds, and firing circuit means responsive to the frequency of the voltage induced in the field winding during sub-synchronous operation and responsive to the polarity and magnitude of said induced voltage for actuating said exciter switch means to the conductive state when said frequency has decreased to a predetermined low value and when the polarity and magnitude of said induced voltage are such that said field discharge switch means is made non-conductive before the exciter switch means is actuated.

3. In a synchronous motor having a rotating field winding, an alternating current exciter having an armature rotatable with the motor field winding, and rectifier means connected to the exciter armature and rotatable therewith for supplying direct current excitation to the motor field winding, a control system for the motor field winding including semiconductor exciter switch means connected between said rectifier means and the motor field winding to control said direct current excitation, a field discharge resistor, semiconductor field discharge switch means for connecting said resistor across the field winding during operation at sub-synchronous speeds, and firing circuit means for actuating said exciter switch means to the conductive state, said firing circuit means including first circuit means responsive to the frequency of the voltage induced in the field winding during sub-synchronous operation and second circuit means responsive to the polarity and magnitude of said induced voltage, said first and second circuit means cooperating to actuate the exciter switch means to the conductive state when said frequency has decreased to a predetermined low value and when the polarity and magnitude of said induced voltage are such that said field discharge switch means has been made non-conductive before the exciter switch means is made conductive.

4. In a synchronous motor having a rotating field winding, an alternating current exciter having an armature rotatable with the motor field winding, and rectifier means connected to the exciter armature and rotatable therewith for supplying direct current excitation to the motor field winding, a control system for the motor field winding including semiconductor exciter switch means connected between said rectifier means and the motor field winding to control said direct current excitation, a field discharge resistor, semiconductor field discharge switch means for connecting said resistor across the field winding during operation at sub-synchronous speeds and firing circuit means for actuating said exciter switch means to the conductive state, said firing circuit means including a timing circuit responsive to the frequency of the voltage induced in the field winding during sub-synchronous operation, said timing circuit producing an output pulse when said frequency has decreased to a predetermined low value, means responsive to the polarity and magnitude of said induced voltage to be actuated when said polarity and magnitude are such that said field discharge switch means has been made non-conductive, and means operable upon actuation of said polarity and magnitude responsive means after occurrence of a timing circuit output pulse for effecting actuation of the exciter switch means.

5. In a synchronous motor having a rotating field winding, an alternating current exciter having an armature rotatable with the motor field winding, and rectifier means connected to the exciter armature and rotatable therewith for supplying direct current excitation to the motor field winding, a control system for the motor field winding including semiconductor exciter switch means connected between said rectifier means and the motor field winding to control said direct current excitation, a field discharge resistor, semiconductor field discharge switch means for connecting said resistor across the field winding during operation at sub-synchronous speeds, and firing circuit means for actuating said exciter switch means to the conductive state, said firing circuit means including a timing circuit responsive to the frequency of the voltage induced in the field winding during sub-synchronous operation, said timing circuit producing an output pulse during a half-cycle of one polarity of said induced voltage when said frequency has decreased to a predetermined low value, a semiconductor frequency switch, means for applying said output pulse to gate the frequency switch, voltage responsive means for controlling current flow through the frequency switch, said voltage responsive means being adapted to permit current to flow through the frequency switch when said induced voltage is of opposite polarity and exceeds a predetermined value such that said field discharge means is made non-conductive, and means for actuating said exciter switch means in response to current flow through the frequency switch.

6. The combination defined in claim 5 in which the timing circuit comprises a capacitor connected to be charged by said induced voltage during half-cycles of one polarity and means for producing an output pulse when the capacitor voltage exceeds a predetermined value, and said voltage responsive means comprises a breakdown diode connected in series with the frequency switch across the field winding, said breakdown diode being adapted to become conducting when the induced voltage is of opposite polarity and of sufficient magnitude to cause said field discharge switch means to become non-conductive.

7. In a synchronous motor having a rotating field winding, an alternating current exciter having an armature rotatable with the motor field winding, and rectifier means connected to the exciter armature and rotatable therewith for supplying direct current excitation to the motor field winding, a control system for the motor field winding including semiconductor exciter switch means connected between said rectifier means and the motor field winding to control said direct current excitation, a field discharge resistor, semiconductor field discharge switch means for connecting said resistor across the field winding during operation at sub-synchronous speeds, and firing circuit means for actuating said exciter switch means to the conductive state, said firing circuit means including a timing circuit responsive to the frequency of the voltage induced in the field winding during sub-synchronous operation, said timing circuit producing an output pulse during a half-cycle of one polarity of said induced voltage when said frequency has decreased to a predetermined low value, semiconductor switching means connected to said timing circuit to be made conductive by said output pulse, a capacitor connected to be charged by said induced voltage when said switching means is conductive, a semiconductor frequency switch, said capacitor being connected to the frequency switch to apply a gating signal thereto when the switching means is made non-conductive by reversal of the induced voltage to the opposite polarity, voltage responsive means for controlling current flow through the frequency switch, said voltage responsive means being adapted to permit current to flow through the frequency switch only when the induced voltage is of said opposite polarity and of sufficient magnitude to make said field discharge switch means non-conductive, and means for actuating said exciter switch means in response to current flow through the frequency switch.

8. The combination defined in claim 7 including energy storage means connected across said induced voltage and adapted to discharge through the frequency switch to increase the level of energy available for actuating the exciter switch means.

References Cited

UNITED STATES PATENTS

| | | | |
|---|---|---|---|
| 3,350,613 | 10/1967 | Brockman et al. | 318—183 XR |
| 3,098,959 | 7/1963 | Rosenberry | 318—181 |
| 3,293,518 | 12/1966 | Neumann | 318—181 |
| 3,314,001 | 4/1967 | Brockman | 322—68 |

OTHER REFERENCES

Silicon Controlled Rectifier Manual, 3rd ed., General Electric Co., 1964, TK 2798G 49, 1964, pp. 128, 129.

ORIS L. RADER, *Primary Examiner.*

G. RUBINSON, *Assistant Examiner.*